United States Patent [19]

Chang et al.

[11] Patent Number: 5,112,121
[45] Date of Patent: May 12, 1992

[54] DISPLAY SYSTEM FOR MULTIVIEWER TRAINING SIMULATORS

[76] Inventors: David B. Chang, 14212 Livingston St., Tustin, Calif. 92680; Norton L. Moise, 1674 Palisades Dr., Pacific Palisades, Calif. 90272; I-Fu Shih, 3351 St. Albans Dr., Los Alamitos, Calif. 90720

[21] Appl. No.: 326,712
[22] Filed: Mar. 21, 1989
[51] Int. Cl.$^5$ ............................................. G03H 1/28
[52] U.S. Cl. ........................................ 359/15; 353/94; 359/22; 359/24
[58] Field of Search ............... 350/3.75, 3.77, 3.81, 350/3.7; 353/94

[56] References Cited

U.S. PATENT DOCUMENTS

| | | |
|---|---|---|
| 3,807,828 | 4/1974 | Johnson et al. ............... 350/3.75 |
| 3,915,551 | 10/1975 | Silverman et al. ............. 350/3.75 |
| 4,037,919 | 7/1977 | Takeda et al. ................. 350/3.81 |
| 4,078,177 | 3/1978 | Tiemens ......................... 350/3.77 |
| 4,730,881 | 3/1988 | Taguchi et al. ................ 350/3.77 |
| 4,790,613 | 12/1988 | Moss .............................. 350/3.7 |
| 4,795,223 | 1/1989 | Moss .............................. 350/3.75 |
| 4,818,048 | 4/1989 | Moss .............................. 350/3.7 |
| 4,892,369 | 1/1990 | Moss .............................. 350/3.7 |

*Primary Examiner*—Bruce Y. Arnold
*Assistant Examiner*—Martin Lerner

[57] ABSTRACT

A display system is disclosed which employs multiple holographic elements for selectively reflecting images from separate projectors to one or more distinct viewing volumes. The display system provides the capability to project differing perspective images to individual crew members located at separated positions within a training simulator.

4 Claims, 3 Drawing Sheets

DISPLAY SYSTEM FOR MULTIVIEWER TRAINING SIMULATORS

FIELD OF THE INVENTION

This invention relates generally to screens for image projection. Particularly, the invention disclosed relates to screens comprised of multiple holographic elements for selectively reflecting different perspective images to different viewers in a training simulator.

BACKGROUND OF THE INVENTION

Most prior art projection screens are diffuse and scatter incident light evenly in all directions. Imagery projected either from the front or rear of the screen may be seen from all locations in front of the screen. However, observers receive only a small fraction of the incident light energy, and the image brightness is reduced. Achieving a brighter image requires an increase in projector light output or the use of "high-gain" screens. Projector output is limited as a practical matter due to the high complexity and cost of increasing projector output significantly.

Various design approaches have been attempted for high-gain screens. Screens containing arrays of corner reflectors or refraction-matched glass beads provide increased gain from the screen. However, both techniques provide a retroreflecting screen. The majority of the light from the projector is reflected directly back into the projector.

Arrays of simple specular reflectors may be used to direct the light reflected from the projector in the desired direction. Screens consisting of numerous small lenticular elements may also be used. The individual lenticular elements control the light distribution pattern which, in theory, can provide any desired luminous distribution pattern. Fabrication and maintenance of either the specular reflecting array or the lenticular screen is extremely complex and expensive.

The use of one or more holographic optical elements (HOE) to construct a screen provides optimum screen gain within a specific viewing volume. A screen formed using HOEs in this fashion provides a brighter image to the observer within the smaller viewing volume. Outside this viewing volume, a very dim image, or no image at all, will be visible. Increase in the viewing volume will reduce the gain of the screen, defeating the purpose of the high-gain screen.

Where the screen is to be viewed by more than one observer, particularly if the two observers are displaced by any significant distance, the viewing volume must be increased such that both observers may see the image on the screen. Where a HOE element screen is used in an advanced training simulator, an additional difficulty is encountered; incorrect perspective.

The perspective of each observer will vary, depending upon the viewing position, when the focal length of the image presented on the screen is short. This is particularly evident with a close-range scene such as an aircraft landing or taking off or in helicopter nap-of-the-earth flight. The perspective of two viewers sitting spaced apart may differ significantly.

Moreover, simple expansion of the viewing volume on an HOE screen from a single projector will not provide a correct perspective to each of the observers in this arrangement. Current systems obtain correct perspective views by separating each observer's view into a distinct channel and viewing arrangement. Each observer sees the correct perspective view through his own display channel.

Using the example of an aircraft simulator, the disadvantage of this arrangement can be seen. The pilot's window provides the correct perspective for the pilot, and the co-pilot's window provides the correct perspective for the co-pilot. However, the co-pilot cannot look out the pilot's window and vice versa. Therefore, the degree of reality is significantly reduced.

The present invention alleviates the difficulty of separate perspective views while maintaining the maximum gain provided by a limited viewing volume.

SUMMARY OF THE INVENTION

The present invention provides multiple individual viewing volumes from a single screen. Multiple projector angle and viewing volume pairs are obtained from a single-screen element by superimposing multiple holograms on one substrate.

Each hologram is exposed using standard techniques as exemplified by R. J. Collier et al. in their book *Optical Holography*, Academic Press 1971. The reference and object beams used to expose each hologram, however, are positioned with different angular orientation with respect to the hologram being exposed. Each hologram then has a different projector angle and viewing volume. Superimposing two or more holograms thus exposed provides multiple viewing volumes, each with a separate projector position.

The HOE created in this fashion projects the image from multiple projectors to the appropriate viewing volumes, thus providing a correct perspective view for observers seated in each of the viewing volumes from the single screen. High gain is achieved in the view seen by each observer since the image from each projector is reprojected by the HOE to a very limited viewing volume.

A viewing screen is fabricated using a plurality of holograms. The first hologram is exposed using a first wavelength of coherent light generated by a laser or other appropriate source with an angular orientation to provide a first projection direction and an associated first viewing volume. The second and subsequent holograms are exposed using a different projection direction and associated viewing volume. The second and subsequent holograms can also be exposed using different wavelength coherent light sources; however, the same wavelength may be used when exposure geometries provide angularly distinct projection directions and viewing volumes. Superimposing the holograms created using this technique creates a viewing screen with multiple viewing volumes, each of which has high gain. In addition, the multiple holograms may be achieved on one single recording medium by exposing the single medium multiple times at multiple geometries.

A large screen of arbitrary shape may be created by combining multiple holographic optical elements each consisting of multiple superimposed holograms. Returning to the example of a training simulator, a semi-spherical screen may be created in this manner. Viewing volumes for two or more crew members seated at their appropriate duty stations provide a correct perspective for each crew member, presented from a separate projector for each crew member but viewed on a common screen, thereby increasing the realism of the training simulator.

Color projection from the screen may be achieved by superimposing additional holograms in each holographic optical element. The holograph element created for each projector direction and viewing volume is created by superimposing three separate holograms each exposed with a specific wavelength of coherent light in one of the primary color bands, red, green, or blue. Each holographic element with three color holograms provides a specific projection, direction and viewing volume. Superimposing the holographic elements then provides multiple color viewing volumes from separate projectors.

DETAILED DESCRIPTION OF THE PREFERRED EMBODIMENT

Figure 1:
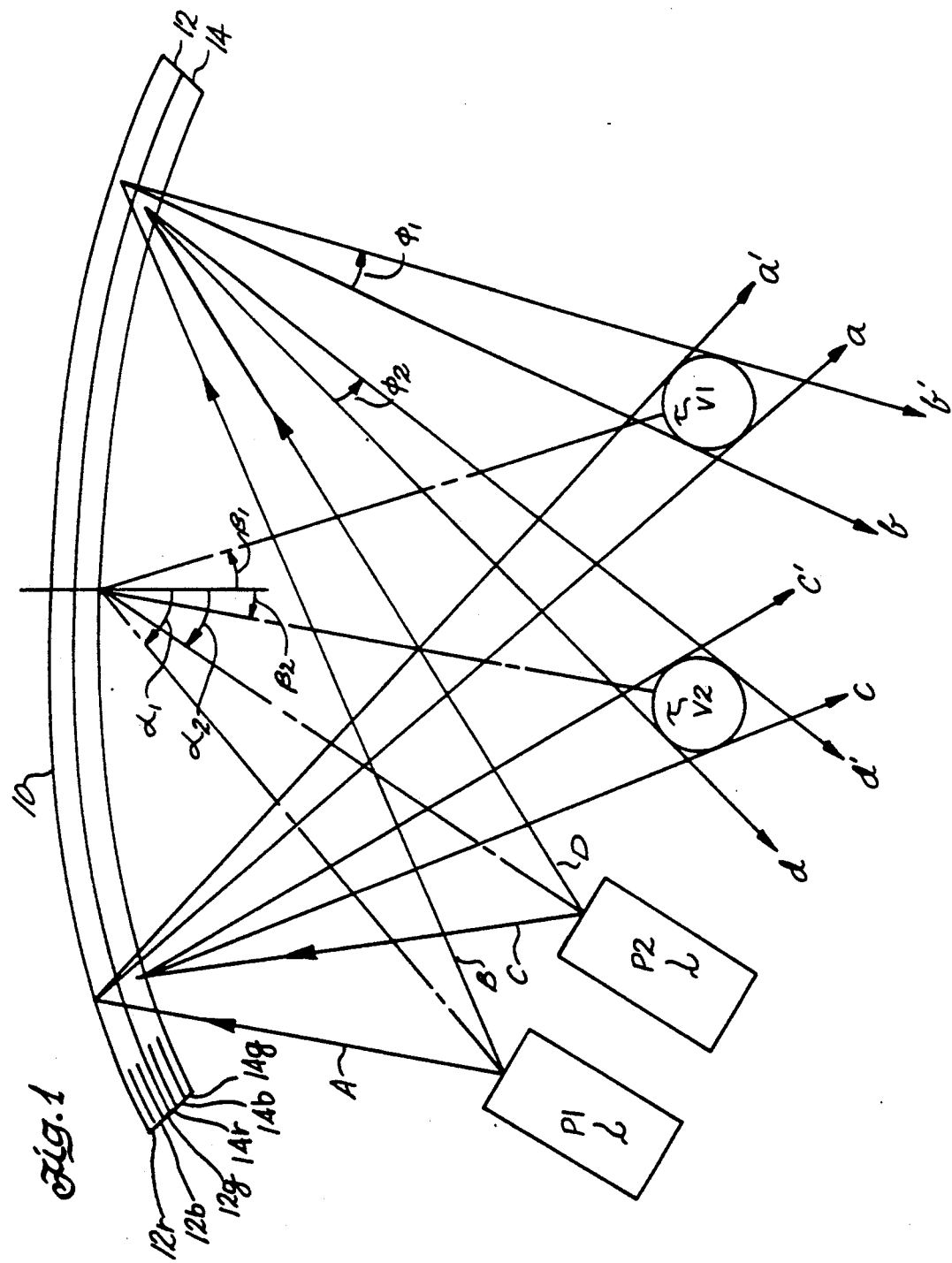
FIG. 1 provides a schematic representation of an embodiment of the invention using two superimposed holographic optical elements to provide two viewing volumes from two projectors.

Referring now to the drawings, FIG. 1 provides a depiction of the invention as used for a training simulator where two crew members require two separate perspective views. A projection screen is created by one or more holographic optical elements 10. A first holographic element 12 which is responsive to a first wavelength of light provides a high gain image to a first viewing volume V1. A second holographic element 14 which is responsive to a second wavelength of light provides images to a second viewing volume V2. A first projector P1 located in a projection direction with respect to the holographic element 10 represented by the first projection angle $\alpha 1$ projects an image to the first holographic element 12. The image from projector P1 is reflected from holographic element 12 to the first viewing volume V1 which is located relative to the holographic optical element 10 by the first viewing angle $\beta 1$. Light rays from the first projector A and B are transmitted to the viewing volume as high gain light represented by rays a, a', b, and b'. A second projector P2 located at a second projection angle $\alpha 2$ with respect to the holographic optical element 10 provides an image to a second holographic element 14. This second image is reflected to the viewing volume V2 which is located at a second viewing angle $\beta 2$ with respect to the holographic optical element 10. Light rays of the second image C and D emanating from the second projector P2 are reflected as high gain light rays c, c', d, and d' to viewing volume V2 from the second holographic element 14.

The scenes projected from projectors P1 and P2 may be entirely different. However, in the present embodiment, the images are a different perspective of the same scene provided to volumes V1 and V2 for added realism. It should be noted that an alternate embodiment of the invention where projection angles $\alpha 1$ and $\alpha 2$ are identical would allow a single projector to provide high gain light images to two viewing volumes from holographic elements 12 and 14. Similarly, yet another embodiment of the invention uses two projectors at projection angles $\alpha 1$ and $\alpha 2$ to superimpose two high-gain light images onto a single viewing volume where viewing angles $\beta 1$ and $\beta 2$ are identical. In addition, superimposing additional holographic elements would allow the reflection of images from additional projectors to additional viewing volumes. The distinct advantage of the present invention over the prior art can be discerned by examining FIGS. 2a and 2b. FIG. 2a is a representation of a retroreflective high gain screen. The high gain screen 16 specularly reflects images from the projector 18 in a retroreflective manner. The viewing volume VR for highest gain is located directly on the projection axis 20 of the projector 18. As previously described, a viewer located outside the viewing volume VR will see a significantly reduced light intensity.

Figure 2B:
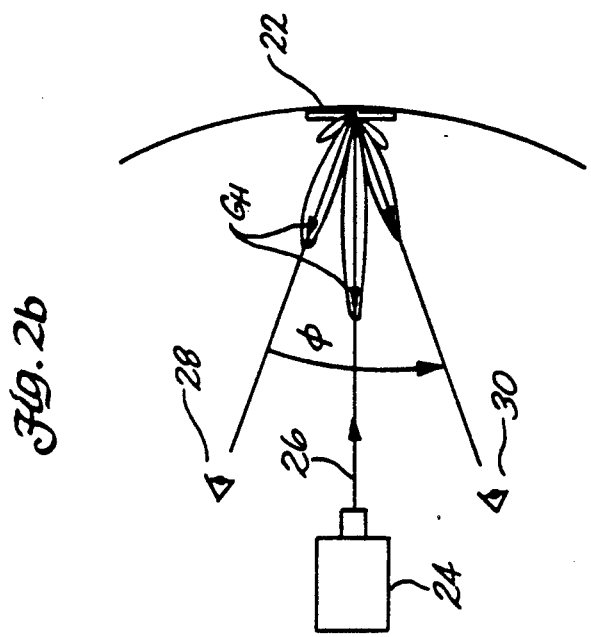
FIG. 2b provides a schematic representation of a prior art high gain screen with an expanded viewing volume from a single hologram.
Figure 2A:
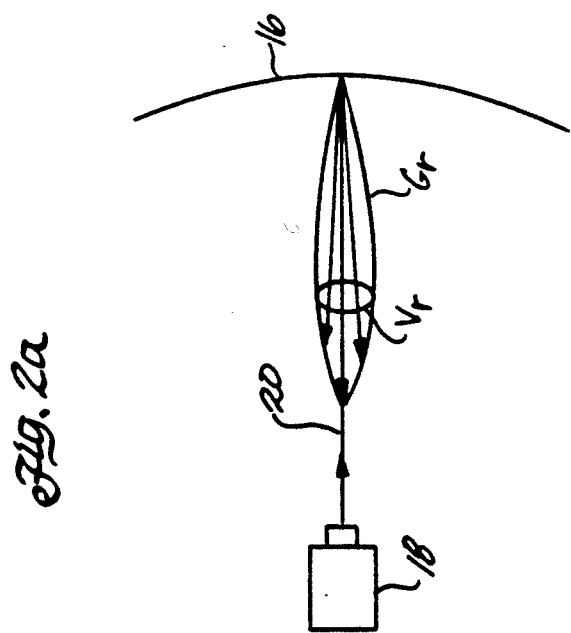
FIG. 2a provides a schematic representation of a prior art retroreflective high gain screen.

An example of the prior art using holography techniques is shown in FIG. 2b. A high gain screen made up of one or more holograms 22 reflects an image from the projector 24. While the use of holographic techniques allows the viewing volume to be displaced angularly from the axis of the projection 26, the viewing volume angle $\phi$ must be made larger if multiple viewers must see the scene. In order to accommodate a pilot 28 and co-pilot 30 in a training simulator, the viewing volume must incorporate the viewing positions of both the pilot and co-pilot. This requires an increase in the viewing volume angle with a commensurate reduction in gain provided by the screen.

Returning to FIG. 1, the present invention unlike the prior art provides distinct viewing volumes for multiple viewers. The viewing volume angles $\phi 1$ and $\phi 2$ may remain narrow to provide maximum gain of the light reflected to the viewing volumes.

Projection of color images using the current invention may be accomplished by combining individual primary color holograms in each holographic element. The first holographic element 12 is fabricated by superimposing a first hologram 12R, a second hologram 12B and a third hologram 12G. Hologram 12R is responsive to a specific frequency R1 of coherent red light. Hologram 12B is responsive to a specific wavelength of blue light B1 and hologram 12G is responsive to a specific wavelength of coherent green light G1. Projector P1 provides mixed color images using the primary color wavelengths R1, B1 and G1. Similarly, the second holographic element 14 is made up of a fourth hologram 14R, fifth hologram 14B and sixth hologram 14G. Fourth hologram 14R is responsive to a second wavelength of coherent red light R2, the fifth hologram 14B is responsive to a second wavelength of blue coherent light B2. The sixth hologram 14G is responsive to a second wavelength of green coherent light G2. Projector P2 provides color images to viewing volume V2 by projecting color images created by combinations of primary color wavelengths R2, B2 and G2.

In the preferred embodiment, each of the individual holograms is responsive to only a specific wavelength of coherent light. The individual primary color channels for the two holographic elements may be made by varying the response wavelength by $\pm 20$ nanometers or more. For example $R1 = R2 \pm 20$nm. First hologram 12R as a reflection hologram will reflect light of wavelength R1 but will not reflect light of wavelength R2. Similar relationships exist for the primary blue and primary green color wavelengths for each of the holographic elements. This relationship can be repeated for additional holographic elements to provide additional viewing volumes. For angularly distinct viewing volumes and projection angles R1 may equal R2, B1 may equal B2 and G1 may equal G2. However, higher quality images are obtained by varying the wavelengths.

Figure 3:
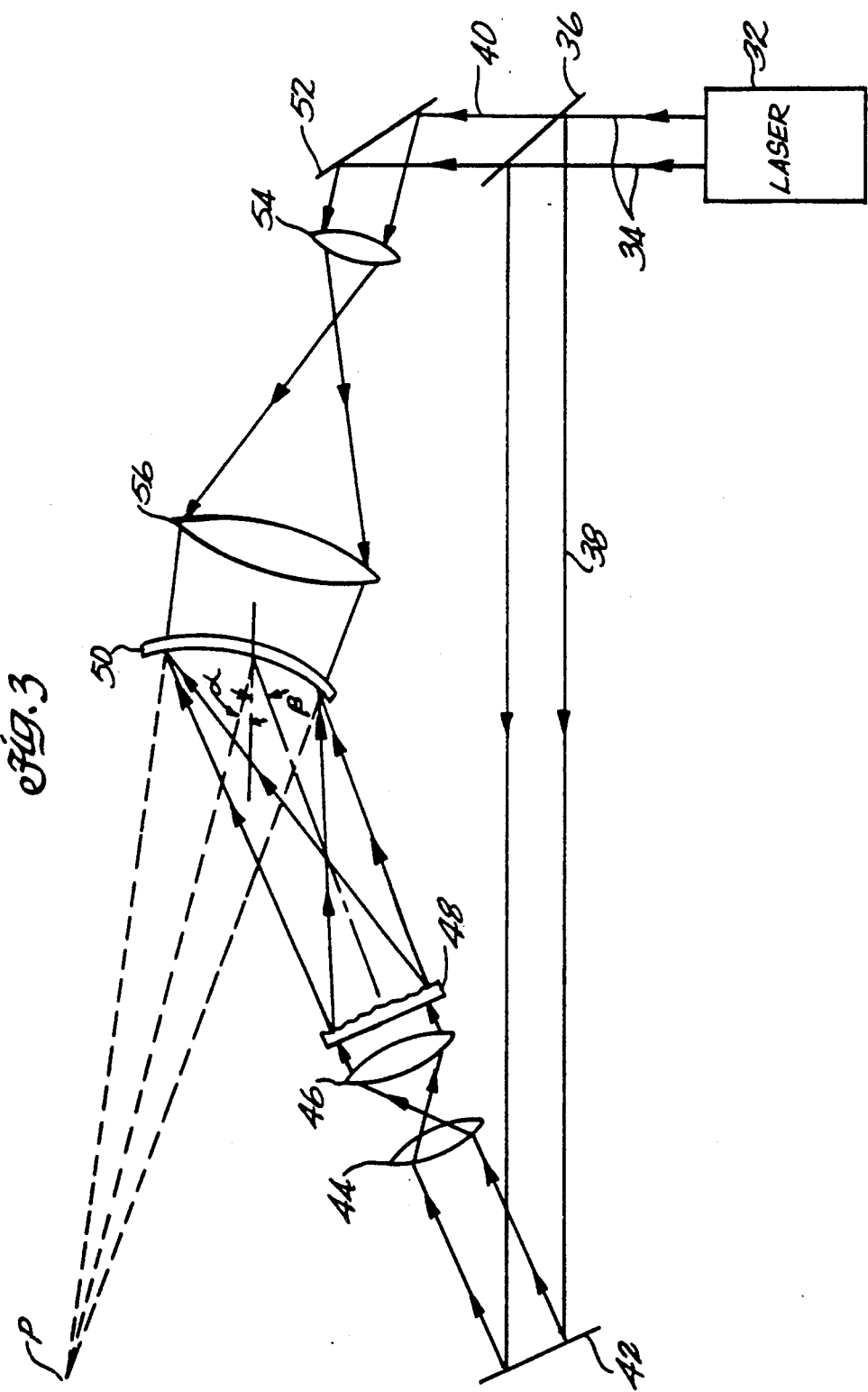
FIG. 3 is a schematic representation of the optical bench setup for exposing the holograms used in the invention.

The exposure of each hologram used in the invention is accomplished with an optical bench setup as shown in FIG. 3. A coherent light source such as a laser 32 provides a coherent light beam 34. A beam splitter 36 consisting of a half silvered mirror or other appropriate partial transmission partial reflectance device splits the beam into a reference beam 38 and an object beam 40. The reference beam 38 is reflected from a mirror 42 through a first focusing lens 44 and through a collimating lens 46 to a diffuse transmission plate 48. The reference beam then impinges the hologram 50. The reference beam angle between the axis of the reference beam optical train and the hologram 50 corresponds to the viewing volume angle. The object beam 40 is reflected from a second mirror 52 through a second focusing lens 54 and a positive lens 56. The converging object beam created by lens 56 is focused through the holographic recording medium 50 to a point P.

Point P is the virtual location for a projector which will reflect an image from the hologram created by the exposed holographic recording medium 50 to a viewing volume having the dimensions of the diffuse transmission plate 48 located at a viewing angle $\alpha$ with respect to the hologram. The distance of the virtual projection point P from the hologram is determined by the focal length of the positive lens 56. The distance of the viewing volume from the hologram along viewing angle is determined by the physical distance of the diffuse transmission plate 48 from the holographic recording medium 50 during exposure.

A projection angle $\beta$ corresponds to the angular relationship of the axis of the object beam optical train passing through point P with respect to the holographic recording medium 50. A monochromatic holographic optical element is fabricated using this technique by exposing a first holographic recording medium with the viewing angle $\beta$ equal to $\beta 1$ of FIG. 1 and the projection angle $\alpha$ equal to $\alpha 1$ of FIG. 1. A second holographic recording medium is exposed with the viewing angle $\beta$ equal to $\beta 2$ of FIG. 1 and the projection angle $\alpha$ equal to $\alpha 2$ of FIG. 1. The two exposed holograms are then superimposed to form the holographic optical element 10 of FIG. 1.

It should be noted that multiple holograms exposed on a single recording medium using the same wavelength of coherent light at different recording geometries can be used in fabrication of the holographic optical element. However, for higher quality images, the presently preferred embodiment uses physical stacking of holograms.

The datum for measurement of the projection and viewing angles $\alpha$ and $\beta$ for various projector and viewing volume combinations is arbitrary with respect to the holographic optical element. The angular relationship between each projector and viewing volume is fixed with relation to the holographic optical elements. For example, in FIG. 1, the paired projector P1 and volume V1 have a fixed angular relationship equal to $\alpha 1$ plus $\beta 1$, establishing a datum for measurement of $\alpha 1$ and $\oplus 1$ separately allows comparison of viewing angles for various viewing volumes independent of the various projection angles. The holographic optical elements shown in FIGS. 1 and 3 are of arbitrary shape. For a planar holographic optical element, the natural selection for a datum for measurement of the projection and viewing angles is perpendicular to the holographic optical element.

A holographic optical element for reflecting color images is fabricated using the optical setup of FIG. 3. Each primary color hologram is exposed using the appropriate wavelength laser as the coherent light source. The three primary color holograms of each holographic element are exposed without varying projection angle $\alpha$ and viewing angle $\beta$. Superimposing the three individual primary color holograms provides a holographic element for reflecting color images from a projector to a specific viewing volume.

The technique for exposing the holographic recording medium as described above provides a reflective hologram for use as a reflective projection screen. The techniques well known in the art for altering the optical bench represented in FIG. 3 to expose a transmission hologram may be used to create a transmission projection screen.

Holographic materials which may be used for the recording medium include dichromated gelatin (DCG) and silver halide (AgX). Both DCG and AgX screens have been demonstrated for use as multiple holographic optical elements. DCG holographic optical elements have been created using optical bench set-ups equivalent to those in FIG. 3. DCG-coated plates were exposed so that, when laminated together after processing, the two gelatin surfaces would be in contact and achieve the desired play-back geometry.

Holographic optical elements made from AgX recording media have not demonstrated efficiency and gains as high as optical elements fabricated using DCG holographic recording media.

Combination of primary color holograms into holographic elements and combination of holographic elements into a holographic optical element to provide multiple viewing volumes for a through transmission projection screen with projectors located at corresponding projection angles behind the screen is a second embodiment of this invention.

In addition, large projection screens may be created by combining multiple holographic optical elements in an array. Production of such multi-element array screens is simplified due to the fact that all horizontally adjacent elements may be exposed with the same projection angle and viewing volume angle. As an example, a semi-spherical screen is fabricated from multiple holographic optical elements. The individual holograms of each element located at a common latitude on the sphere may be exposed using an identical optical bench setup.

Having now described the invention in accordance with the requirements of the patent statutes, those skilled in the art of holography will have no difficulty making changes and modifications in the embodiment of the individual elements of the invention in order to meet specific requirements or conditions. Such modifications and changes may be made without departing from the scope and spirit of the invention as set forth in the following claims.

We claim:
1. A viewing screen comprising:
a first holographic element having a plurality of holograms for receiving incident light at a plurality of wavelengths to project a scene at a first angle; and
a second holographic element superimposed on said first holographic element and having a plurality of holograms for receiving incident light at a plurality of wavelengths to project a scene at a second angle,
in which the first holographic element is a combination of holograms comprising a first primary red color hologram responsive to red coherent light;
a first primary blue color hologram responsive to blue coherent light;
a first primary green color hologram responsive to green coherent light; and
the second holographic element is a combination of holograms comprising a second primary red color hologram responsive to red coherent light;
a second primary blue color hologram responsive to blue coherent light; and
a second primary green color hologram responsive to green coherent light.

2. A viewing screen comprising:
a first holographic element having a plurality of holograms for receiving incident light at a plurality of wavelengths to project a scene at a first angle; and
a second holographic element superimposed on said first holographic element and having a plurality of holograms for receiving incident light at a plurality of wavelengths to project a scene at a second angle,
in which the first holographic element is a combination of holograms comprising:
a first primary red color hologram responsive to a first wavelength of red light;
a first primary blue color hologram responsive to a first wavelength of blue light;
a first primary green color hologram responsive to a first wavelength of green light; and
the second holographic element is a combination of holograms comprising:
a second primary red color hologram responsive to a second wavelength of red light;
a second primary blue color hologram responsive to a second wavelength of blue light; and
a second primary green color hologram responsive to a second wavelength of green light.

3. A flight simulator optical system comprising:
a pilot's position;
a co-pilot's position;
a screen having multiple holographic optical elements with first and second superimposed holographic elements;
a first projector reflecting light from each of the first holographic elements to the pilot's position; and
a second projector reflecting light from each of the second holographic elements to the co-pilot's position.

4. A flight simulator optical system as defined in claim 3 further comprising at least an additional crew position, at least one additional holographic element superimposed on each of the holographic optical elements in the screen, and at least one additional projector reflecting light from each of the additional holographic elements to the additional crew position.

* * * * *